June 26, 1962 W. G. FROST 3,040,439
SOLIDS FLUIDIZING VESSEL AND GAS DIFFUSER PLATE
AND NOZZLE ELEMENTS THEREFOR
Filed July 21, 1959
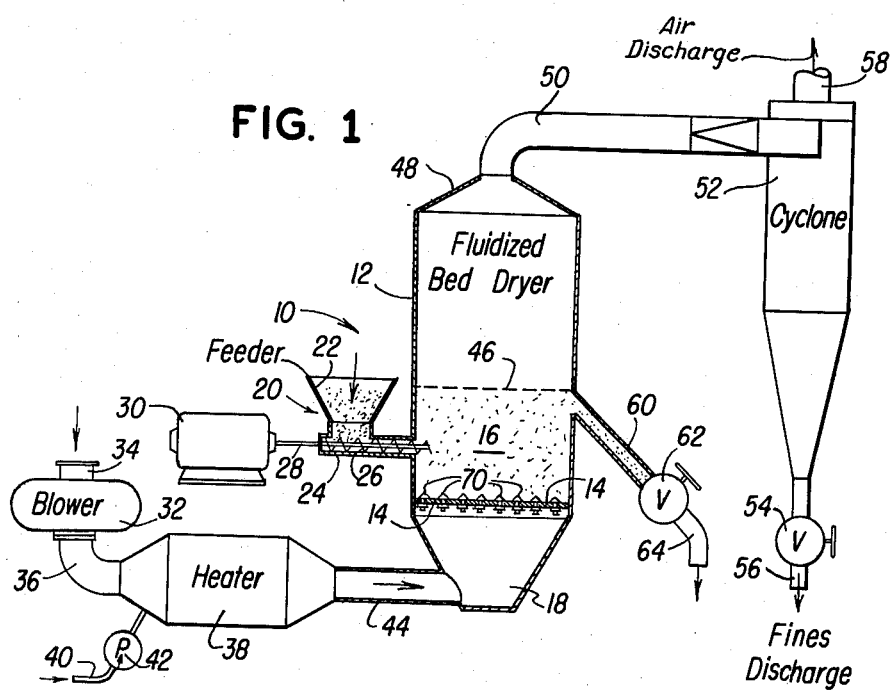
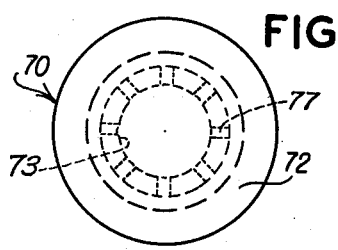
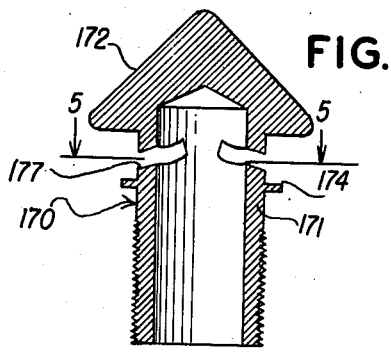
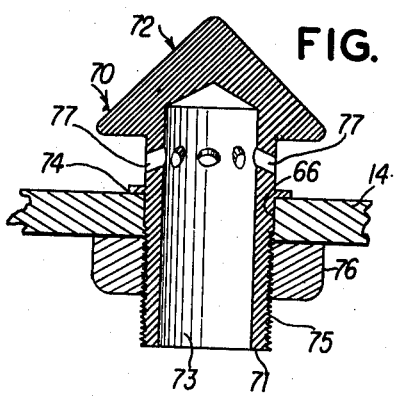
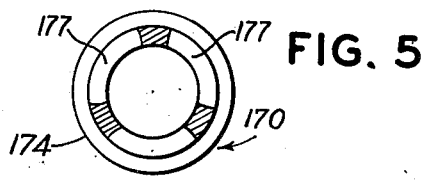
INVENTOR.
William G. Frost
BY
Pranglay, Baird Clayton,
Miller & Vogel, Attys.

United States Patent Office 3,040,439
Patented June 26, 1962

3,040,439
SOLIDS FLUIDIZING VESSEL AND GAS DIFFUSER PLATE AND NOZZLE ELEMENTS THEREFOR
William G. Frost, La Grange Park, Ill., assignor to General American Transportation Corporation, Chicago, Ill., a corporation of New York
Filed July 21, 1959, Ser. No. 828,630
4 Claims. (Cl. 34—57)

The present invention relates to a solids fluidizing apparatus of the type wherein a bed of solids is maintained under solids fluidizing conditions by means of gas passing through a gas diffuser plate and to an improved diffuser plate and nozzle elements therefor.

The present invention has been illustrated in a fluidized bed drier of the type wherein a closed cylindrical vessel is provided with a horizontally disposed apertured partition or plate to divide the vessel into an upper drying chamber and a lower chamber or windbox. The upper chamber is adapted to contain a bed of solids fluidized by passing a stream of gas, such as air, upwardly through the apertured plate and through the bed of solids at solids fluidizing velocities, whereby the solids of the bed are fluidized, i.e., rendered into turbulent mobility so that the solids act like a boiling liquid. The apertured plate serves to distribute and to diffuse the air so as to maintain the solids of the fluidized bed in the proper solids fluidizing condition.

Heating of the fluidized bed of solids is obtained by utilizing heated air as the fluidizing medium, whereby each particle of the solid is surrounded intimately by the heated air to obtain heat transfer to the solid under optimum conditions. The stream of heated air can also be utilized to cause separation of the solids in accordance with the particle size thereof so as to permit separation between the solids and the fines and even separation between the relatively fine material and the relatively coarse material, the fine material being removed from the fluidized bed of solids by the passage of the air stream therethrough, whereby subsequent separation of the fines from the air stream can be achieved to effect recovery of the fines while the larger or coarser material is retained in the fluidized bed for removal, as desired.

Occasionally it is necessary to shut down the fluidized bed drier, for example, for recharging or cleaning thereof, or when changing from the handling of one material to another. In the case of shutdown, it is found that defluidization of the solids of the bed disposed above the diffuser plate permits the solids which are normally smaller in size than the diameter of the apertures in the diffuser plate to sift or spill downwardly therethrough and to accumulate in the windbox therebeneath. This is undesirable since the windbox must then be cleaned which is an expensive and time consuming operation. Various devices have been employed heretofore to prevent the dropping of the solids into the windbox when the drier is shut down, but these prior devices have not been entirely satisfactory in operation.

Vessels containing structure for the establishment of the fluidized beds of solids therein have been cleaned heretofore only with difficulty because of the difficulty in shutting down the apparatus and further because of the complicated construction of the gas diffuser plates which have been utilized heretofore. Furthermore, the gas diffuser plates ordinarily are designed to operate with a particular solid material under predetermined and precise operating conditions and cannot be readily converted to accommodate other solid materials under substantially different operating conditions. Other problems are encountered in stabilizing the fluidized bed during operation, and still other problems are encountered in initiating operation of the drier and establishing the fluidized bed therein which problems have not been adequately solved by the prior devices.

Accordingly, it is an important object of the present invention to provide an improved vessel for establishing and holding a fluidized bed of solids therein and particularly an improved gas diffuser plate and nozzle elements therefor.

Another object of the invention is to provide an improved gas diffuser plate in which the gas passages or openings therein are always substantially covered, thereby to prevent passage of solids into the windbox provided beneath the gas diffuser plate, regardless of whether gas is passing through the openings.

Another object of the invention is to provide a control structure for a gas diffuser plate of the type noted which tends to stabilize the fluidized bed and to facilitate fluidizing of the bed while starting operation thereof.

A further object of the invention is to provide a gas diffuser plate of the type noted having nozzle elements disposed over the openings thereof, the nozzle elements resting upon the plate so as substantially to close the openings therein, thereby to prevent solids from falling through the openings while permitting the flow of gas past the nozzle elements and through the plate, thereby to facilitate fluidization of the bed of solids supported by the plate.

Yet another object of the invention is to provide a gas diffuser plate having nozzle elements therein of the type noted, wherein the nozzle elements can be readily removed to facilitate cleaning of the plate.

A further object of the invention is to provide a gas diffuser plate having nozzle elements therein of the type noted, wherein the nozzle elements can be readily changed, thereby to accommodate different solid materials within the fluidized bed and to permit operation at different gas pressures across the diffuser plate and at different rates of gas flow through the diffuser plate.

A still further object of the invention is to provide a nozzle element for use in a solids fluidizing vessel and with a diffuser plate of the type noted.

Further features of the invention pertain to the particular arrangement of the elements of the gas diffuser plate and nozzle elements thereof, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a diagrammatic and schematic illustration, with certain portions in section, of apparatus embodying the present invention and employed for establishing a fluidized bed of solids therein, that is particularly useful for drying the solids and effecting a particle size separation thereof, together with the auxiliary equipment used therewith;

FIG. 2 is a greatly enlarged fragmentary vertical sectional view taken through the diffuser plate forming a part of the apparatus of FIG. 1, and illustrating the structure thereof and of a nozzle element in association therewith, particularly embodying the present invention;

FIG. 3 is a plan view of the nozzle element shown in FIG. 2;

FIG. 4 is a vertical sectional view of a modified form of the nozzle element; and FIG. 5 is a horizontal sectional view of the nozzle element taken in the direction of the arrows along the line 5—5 in FIG. 4.

Referring now to FIG. 1 of the drawing, there is shown apparatus 10 incorporating the improved gas diffuser plate and nozzle elements embodying the features of the present invention; and more specifically there is illustrated a fluidized bed drier 10 of the single-stage drying type and also including therein structure to effect a size classification of the solids being dried. It is to be understood that the gas diffuser plate and the nozzle elements of the present invention are useful in other structures employing beds of fluidized solids, and the fluidized bed drier 10 has been shown in the drawings and described only as being illustrative of one particular application of the improved gas diffuser plate and the nozzle elements of this invention.

The fluidized bed drier 10 includes an upstanding cylindrical vessel 12 which is preferably formed of metal and is provided intermediate the ends thereof with a generally horizontally disposed gas diffuser plate 14 which divides the vessel 12 into an upper chamber holding a bed 16 of solids to be fluidized above the plate 14 and a lower chamber therebeneath and comprising the usual windbox 18.

The material to be treated in the vessel 12 is delivered thereto by a feeder 20 and including a hopper 22 in which the material is placed for delivery to a screw type conveyor including a housing 24 and a feed screw 26 disposed therein. The housing 24 is connected to the wall of the vessel 12 and communicates with the interior thereof at a point disposed substantially at the midpoint vertically of the fluidized bed 16, and the conveyor screw 12 may actually extend into the bed 16 as illustrated. The screw 26 is provided with a drive shaft 28 which is connected to the drive shaft of a suitable electric drive motor 30, whereby operation of the motor 30 will rotate the screw 26 about its axis and feed solid materials from the hopper 22 into the upper zone or chamber of the vessel 12 in which the fluidized bed 16 is established.

Hot gases are preferably utilized in the vessel 12 to establish the fluidized bed 16 so that the solids in the bed 16 are heated and thereby dried as well as being separated as to size. To this end a blower 32 is provided having an intake pipe 34 connected to a suitable source of atmospheric air, the outlet of the blower 32 being connected to a high pressure pipe 36 communicating with a heater 38. Any suitable fuel, such as oil, is fed from a source (not shown) through a pipe 40 by means of a pump 42, whereby the air from the blower 32 mixing with the oil can be ignited, so as to heat the air and the combustion gases to the desired temperature. The hot combustion gases, together with any excess air from the blower 32, are fed through a pipe 44 to the windbox 18 and particularly to the lower portion thereof. The windbox 18 is of the usual frusto-conical construction and may be provided with a cleaning port (not shown). The upper end of the windbox 18 connects directly with the lower end of the vessel 12 thereby substantially to seal the bottom end thereof, and more particularly connects therewith at a point below the horizontally disposed diffuser plate 14.

Air passing upwardly from the windbox 18 through apertures in the diffuser plate 14 will serve to fluidize any solids in the zone of the bed 16 thereby to establish a substantially stable bed which rises to a level indicated by the numeral 46, the level 46 being held substantially constant by regulating the addition of material to the vessel 12 and the withdrawal therefrom in combination with the regulation of the gases supplied from the windbox 18. The hot gases rising through the bed 16 are brought into intimate contact with the solids therein thereby to effect heat transfer between the hot gases and the solids so as to evaporate any water or other liquids on the solids and thus effect drying thereof. In addition, the velocity of the gases through the fluidized bed 16 may be sufficient to entrain the smaller solid particles thereby to carry the smaller particles above the level 46 and into the upper end of the vessel 12 disposed thereabove.

The upper end of the vessel 12 disposed above the level 46 is covered by a frusto-conical member 48 which in turn is attached to and internally communicates with a pipe 50 connected to the upper portion of a cyclone 52. The cyclone 52 serves to separate any solid materials entrained in the gas stream in the usual manner thereby to permit the solid materials to fall downwardly within the cyclone 52 and through a discharge valve 54 into a discharge pipe 56, the material falling therethrough being ordinarily referred to as "fines" to distinguish the same from the particles of larger size which remain in the fluidized bed 16. The gases after separation from the solid fines are discharged from the upper end of the cyclone 52 through a pipe 58, for example, into the atmosphere.

Dried solids too large to be entrained in the gas stream passing through the vessel 12 are preferably continuously discharged from the bed 16 through a pipe 60 which is connected to the vessel 12 at a point below the level 46 defining the upper surface of the fluidized bed, the pipe 60 extending downwardly and having a valve 62 therein which can be periodically opened to discharge dried solids through a product discharge pipe 64.

From the above it can be seen that solids having a substantial liquid content such as water therein and also consisting of both particles of regular size and particles of a smaller size or "fines" can be fed into the hopper 22 and substantially continuously discharged into the fluidized bed 16. The blower 32 operates under a substantially constant pressure to supply air to the heater 38 which is provided with a substantially constant volume per unit time of oil or other combustible material from the pump 42 thereby to produce heated gases having a substantially constant volume passing through the pipe 44 and into the windbox 18 per unit of time. The heated gases pass upwardly through the apertured diffuser plate 14 first to fluidize the solids to provide the bed 16 and also to heat and dry the solids and to separate the fines therefrom. The cooled gases and the water vapor and the vapors of other liquids in the feed material together with the fines pass upwardly through the pipe 50 and into the cyclone 52 where the fines are separated therefrom for discharge through the valve 54, the gases being discharged through the pipe 58 to the atmosphere. The dried product of standard size may be periodically or substantially continuously withdrawn from the fluidized bed 16 through the pipe 60 and the valve 62. It is to be understood that the valves 54 and 62 operate in such a manner so as not adversely to affect the pressure within the system or to permit the escape of gases under pressure therefrom.

Referring now to FIG. 2, the gas diffuser plate 14 is provided with a plurality of apertures 66 therein which may be of circular form; and in accordance with the present invention, each of the apertures 66 is provided with a nozzle element 70 therein, thereby to provide a controlled stream therethrough of hot gases from the windbox 18 into the fluidized bed 16 of solids. Preferably, the nozzle elements 70 are identical and each thereof comprises a substantially cylindrical barrel or shank 71 of hollow tubular form and terminating at the upper end thereof in a substantially conical head 72; whereby a substantially cylindrical passage 73 is formed in the shank 71 extending from the lower open end thereof to the head 72 and terminating therebelow. The upper central portion of the shank 71 carries an outwardly directed substantially annular collar 74 that engages the adjacent upper surface of the diffuser plate 14, in order properly to locate the shank 71 of the nozzle element 70 in the associated aperture 66; and the lower cylindrical surface of the shank 71 is threaded, as indicated at 75, and receives a cooperating threaded nut 76 disposed below and in engagement with the adjacent surface of the diffuser plate 14. Accordingly, the nozzle element 70 is retained in place in the aperture 66 provided in the diffuser plate 14 by the clamping action that is exerted between the collar 74 and the nut 76 respectively disposed above and below the diffuser plate 14 and respectively engaging the adjacent upper and lower surfaces thereof.

The conical head 72 is substantially circular in plan, as illustrated in FIG. 3, and is positioned above the diffuser plate 14 by a predetermined distance, as established by the annular collar 74; and the base of the conical head 72 is substantially larger in diameter than the aperture 66 disposed in the diffuser plate 14, so that the conical head 72 is arranged in covering relation with respect to the associated aperture 66 provided in the diffuser plate 14.

A plurality of circumferentially spaced-apart apertures or holes 77 are provided through the wall of the upper central portion of the shank 71 between the annular collar 74 and the base of the conical head 72, eight of the holes 77 being shown for purpose of illustration. Accordingly, the annular array of holes 77 is located above the upper side of the diffuser plate 14 and below the base of the head 72 and communicates with the upper end of the passage 73 provided through the shank 71. More particularly, the axis of each of the holes 77 is downwardly inclined radially outwardly, so that the gas from the upper end of the passage 73 is directed radially outwardly and downwardly by the holes 77 over the adjacent upper surface of the diffuser plate 14; whereby the gases in the lower windbox 18 pass upwardly through the passage 73 provided in the shank 71 of the nozzle element 70 and are projected in corresponding controlled streams through the holes 77 and beneath the underside of the head 72 and then downwardly and radially outwardly over the adjacent upper side of the diffuser plate 14 and thence upwardly into the fluidized bed 16 of solids disposed in the upper chamber of the vessel 12.

Preferably, each of the nozzle elements 70 is formed of metal and may be advantageously formed of stainless steel (type 304), so as to withstand the temperatures and any chemical attack of corrosive gases contained in the gas stream passing therethrough into the upper chamber of the vessel 12. Moreover, the inclination of the upper surface of the conical head 72 to the horizontal is chosen, so as to minimize the build-up of solid materials therein when the bed 16 is defluidized; and accordingly, the angle of the surface of the head 72 with respect to the horizontal should be greater than the angle of repose of the material in the bed 16. This arrangement will facilitate the initiation of operation and the fluidization of the solid material to form the bed 16 when starting operation of the apparatus 10. In the nozzle element 70 illustrated, the angle of inclination of the surface of the head 72, with respect to the horizontal, has been chosen as 45°; whereby the included angle between diametrically opposed positions on the conical surface of the head 72 is 90°.

In the illustrated embodiment of the nozzle element 70, the base of the conical head 72 has an outside diameter of approximately ⅞"; the collar 74 has an outside diameter of approximately ⅝"; the shank 71 has an outside diameter of approximately ½"; the cylindrical passage 73 provided through the shank 71 has a diameter of approximately 0.3594"; and each of the holes 77 has a diameter corresponding to that produced by a #46 drill. The nozzle element 72 has an overall height of approximately 1¼"; the distance between the lower surface of the base of the head 72 and the adjacent upper surface of the collar 74 is approximately ³⁄₁₆"; the collar 74 has a thickness of approximately ¹⁄₃₂"; and the distance between the lower surface of the collar 74 and the extreme lower end of the shank 71 is approximately 1⁹⁄₃₂". The exterior surface of the shank 71 is threaded a distance from the extreme lower end thereof of approximately ½" with a full depth 20 N.F.-2 thread.

It will be understood that in a commercial form of the apparatus 10, the diffuser plate 14 will have a substantial number of the apertures 66 therein, and may have, depending upon the size of the apparatus 10, from about 5,000 to about 10,000 of such apertures therein, and a corresponding number of the nozzle elements 70 respectively disposed in the apertures mentioned.

When the apparatus 10 is placed in operation, or after a shut-down thereof, there may be a small quantity of the solids to be treated resting upon the head 72 of the nozzle element 70; however, the quantity of product resting on the head 72 of the nozzle element 70 is minimized by the angle of inclination of the surfaces thereof with respect to the horizontal. To initiate operation of the apparatus 10, the blower 32 is started, as are the heater 38 and the feed motor 30, thereby to produce a stream of heated gases. The gases pass into the windbox 18 and upwardly through the passage 73 in the nozzle element 70. Then the gases are directed by the holes 77 provided in each of the nozzle elements 70 radially outwardly below the head 72 thereof and downwardly upon the adjacent upper surface of the diffuser plate 14 and into scrubbing relation therewith, and thence upwardly into the bed 16 of solids, so as to effect fluidizing thereof. The pressure of the gases in the passage 73 in each nozzle element 70 is sufficient to bring about the projection of the controlled streams of the gases through the circumferentially spaced-apart holes 77, as noted above, so as to bring about fluidizing of the bed 16, for the purpose previously explained. Any solids on the head 72 will be quickly incorporated into the fluidized bed 16 and will thereafter exert substantially no downward pressure upon the head 72 of the nozzle element 70.

In the apparatus 10, the number of nozzle elements 70 employed, together with the particular construction of each of the nozzle elements 70 with respect to the number of the holes 77 therein and the cross-sectional area of each of the holes 77, are correlated so that the desired differential pressure is maintained between the lower and upper surfaces of the diffuser plate 14 during the operation of the apparatus 10 to maintain the bed 16 in its fluidized condition.

When it is necessary to shut-down the apparatus 10 by stopping the flow of gases into the windbox 18, the solid material in the bed 16 will settle downwardly upon the diffuser plate 14, and some of the material will settle upon the head 72 of the nozzle element 70. The angle of inclination of the upper surface of each of the heads 72 of each of the nozzle elements 70 causes the material to flow downwardly and outwardly therefrom, and the overhanging perimeter of the base of each head 72 will further prevent the solids from falling downwardly through the holes 77 and thence through the passage 73 into the windbox 18. It will be understood therefore that substantially no solid material will fall downwardly through the nozzle element 70 into the windbox 18, thereby to prevent burdening of the windbox 18.

When it is desired to clean the diffuser plate 14, while the apparatus 10 is shut-down, the nozzle elements 70 may be removed, if such removal is required, by removal of the corresponding nuts 76 provided on the shank 71 thereof. This may be accomplished in a ready manner, since it is not necessary that the nuts 76 be other than merely tightened into place upon the shanks 71 in securing in place the nozzle elements 70. After removal of the nozzle elements 70, the upper and lower plane surfaces of the diffuser plates 14 may be readily cleaned, since there are no other obstructions thereon. Also, it will be understood that the construction of the diffuser plate 14 is exceedingly simple, requiring no special machining thereof or particular care in drilling the holes or apertures 66 therein.

In certain instances, it will be desirable to change the operating conditions, while the drier 10 is shut-down, such, for example, as to adapt the drier to the handling of a different type of solid material. In such case, it may be desirable to substitute a different size and configuration of the nozzle elements 70 from those originally employed, thereby to permit larger or smaller pressure drops across the diffuser plate 14 and to permit a lower or a higher operating pressure and gas velocity within the fluidized bed 16, as required. The exchange of the nozzle elements 70 for different sizes thereof can be readily accomplished, since the nozzle elements 70 are readily removable following loosening and removal of the cooperating nuts 76, as previously explained. After removal of the old nozzle elements 70, the new nozzle elements 70 may be quickly placed in operative position following insertion of the shanks 71 thereof through the apertures 66 in the diffuser plate 14 and followed by replacement of the nuts 76 upon the shanks 71 thereof. With the new nozzle elements 70 in position, they will act automatically to control the pressure differential across the diffuser plate 14 by permitting the gases at the desired rate of flow to pass therethrough from the windbox 18 into the fluidized bed 16 and at the desired pressure.

Referring now to FIGS. 4 and 5, a modified form of the nozzle element 170 is there illustrated that is essentially of the construction of the nozzle element 70, as previously described in conjunction with FIGS. 2 and 3; however, in the construction of the nozzle element 170, only three apertures 177 are formed in the upper central portion of the shank 171 above the collar 174 and below the conical head 172, as clearly illustrated. More particularly, each of the apertures 177 in this case comprises a slot that is formed utilizing a milling cutter, or the like, whereby each of the three slots or holes 177 is downwardly and radially outwardly inclined, as illustrated in FIG. 4. In this arrangement, the number of the slots 177 has been arbitrarily chosen as three; however, any suitable number of such slots may be milled or cut in the upper central portion of the shank 171 as is required by the particular design of the nozzle element 170, for the intended purpose.

The fundamental operation of the modified form of the nozzle element 170 is the same as that of the nozzle element 70 and is not reiterated in the interest of brevity.

While the apparatus 10 has been disclosed in conjunction with the drying of the material in the fluidized solids bed 16 by the hot gases passing therethrough, it will be understood that the arrangement is also useful when the gases are utilized for cooling or chemical treating of the materials in the fluidized solids bed 16, or where the materials in the fluidized solids bed 16 serve as a heat exchange or treatment medium for the gases, liquids or solids being processed in the fluidized solids bed 16 of the apparatus 10.

In view of the foregoing, it is apparent that there has been provided in apparatus utilizing beds of fluidized solids, an improved gas diffuser plate incorporating improved nozzles therefor.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a solids fluidizing vessel including a plate therein provided with openings therethrough and dividing said vessel into an upper solids fluidizing chamber and a lower windbox chamber, and a plurality of nozzle elements respectively associated with the openings in said plate; each of said nozzle elements comprising a shank arranged in the associated opening in said plate, means carried by the upper end of said shank and engaging the associated upper side of said plate for locating said shank in the associated opening in said plate, means carried by the lower end of said shank and cooperating with the associated lower side of said plate for securing said shank in place in the associated opening in said plate, and a head carried by the upper end of said shank and positioned above the upper side of said plate and overlying and substantially covering the associated opening in said plate, said shank having a passage extending upwardly therethrough and communicating with said lower chamber and terminating below said head, said shank also having a plurality of circumferentially spaced-apart apertures therein and located above the upper side of said plate and below said head and communicating with the upper end of said passage, each of said apertures extending radially outwardly and downwardly with respect to the centerline of said shank, whereby gases in said lower chamber pass upwardly through said passage and are projected in a plurality of controlled streams through said apertures radially outwardly and downwardly toward the adjacent upper side of said plate and beneath the underside of said head and then over the upper side of said plate and thence upwardly into the bed of fluidized solids disposed in said upper chamber.

2. In a solids fluidizing vessel including a plate therein provided with openings therethrough and dividing said vessel into an upper solids fluidizing chamber and a lower windbox chamber, and a plurality of nozzle elements respectively associated with the openings in said plate; each of said nozzle elements comprising a threaded shank arranged in the associated opening in said plate, means carried by the upper end of said shank and engaging the associated upper side of said plate for locating said shank in the associated opening in said plate, a nut carried by the lower end of said threaded shank and cooperating with the associated lower side of said plate to secure said shank in place in the associated opening in said plate, and a head carried by the upper end of said shank and positioned above the upper side of said plate and overlying and substantially covering the associated opening in said plate, said shank having a passage extending upwardly therethrough and communicating with said lower chamber and terminating below said head, said shank also having a plurality of circumferentially spaced-apart apertures therein and located above the upper side of said plate and below said head and communicating with the upper end of said passage, each of said apertures extending radially outwardly and downwardly with respect to the centerline of said shank, whereby gases in said lower chamber pass upwardly through said passage and are projected in a plurality of controlled streams through said apertures radially outwardly and downwardly toward the adjacent upper side of said plate and beneath the underside of said head and then over the upper side of said plate and thence upwardly into the bed of fluidized solids disposed in said upper chamber.

3. In a solids fluidizing vessel including a plate therein provided with openings therethrough and dividing said vessel into an upper solids fluidizing chamber and a lower windbox chamber, and a plurality of nozzle elements respectively associated with the openings in said plate; each of said nozzle elements comprising a shank arranged in the associated opening in said plate, means cooperating between said shank and said plate for anchoring said shank in place in the associated opening in said plate, and a head carried by the upper end of said shank and positioned above the upper side of said plate and overlying and substantially covering the associated opening in said plate, said shank being of substantially tubular form defining an upwardly extending passage therethrough and communicating with said lower chamber and terminating below said head, said shank also having a plurality of circumferentially spaced-apart apertures therein and located above the upper side of said plate and below said head and communicating with the upper end of said passage, each of said apertures extending radially outwardly and downwardly with respect to the centerline of said shank, whereby gases in said lower chamber pass upwardly through said passage and are projected in a plurality of controlled streams through said apertures radially outwardly and downwardly toward the adjacent upper side of said plate and beneath the underside of said head and then over the upper side of said plate and thence upwardly into the bed of fluidized solids disposed in said upper chamber.

4. The combination set forth in claim 3, wherein each of said nozzle elements is formed essentially of stainless steel.

References Cited in the file of this patent
UNITED STATES PATENTS

| | | |
|---|---|---|
| 2,338,446 | Lambert | Jan. 4, 1944 |
| 2,378,952 | Rousseau | June 26, 1945 |
| 2,841,476 | Dalton | July 1, 1958 |
| 2,924,441 | Osborne | Feb. 9, 1960 |
| 2,951,747 | Vandaveer | Sept. 9, 1960 |

FOREIGN PATENTS

| | | |
|---|---|---|
| 729,571 | Great Britain | May 11, 1955 |
| 796,753 | Great Britain | June 18, 1958 |